United States Patent [19]
Slinkard et al.

[11] 3,907,833
[45] Sept. 23, 1975

[54] PROCESS FOR OXIDIZING A HYDROCARBON TO MALEIC ANHYDRIDE AND ACETIC ACID

[75] Inventors: William E. Slinkard; Michael P. Hughes, both of Corpus Christi, Tex.

[73] Assignee: Celanese Corporation, New York, N.Y.

[22] Filed: May 15, 1972

[21] Appl. No.: 253,382

[52] U.S. Cl. ............. 260/346.8; 252/435; 252/437; 252/467; 252/469; 252/470; 260/533 R
[51] Int. Cl.² ........................................ C07D 307/60
[58] Field of Search .................. 260/346.8 X, 533 R

[56] References Cited
UNITED STATES PATENTS

| | | | |
|---|---|---|---|
| 2,691,660 | 10/1954 | Hartig............................. | 260/346.8 |
| 3,005,831 | 10/1961 | Dreibelbeis..................... | 260/346.8 |
| 3,074,969 | 1/1963 | Kerr et al........................ | 260/346.8 |
| 3,156,707 | 11/1964 | Kerr................................ | 260/346.8 |
| 3,624,148 | 11/1971 | Ninagawa et al. .............. | 260/346.8 |

FOREIGN PATENTS OR APPLICATIONS

| | | |
|---|---|---|
| 2,058,054 | 6/1971 | Germany |
| 677,753 | 8/1966 | Belgium |
| 707,926 | 11/1970 | South Africa |
| 45-14409 | 5/1970 | Japan |
| 166,670 | 12/1964 | U.S.S.R. |

OTHER PUBLICATIONS

Mikkal, "Trud. Tallinskogo Politekhicheskogo Instituta", (U.S.S.R.), Series A, 228, p. 49–60, (1965).
Raudsepp et al., "Trud. Tallinskogo Politekhicheskogo Instituta", (U.S.S.R.), Series A, 228, p. 61–70, (1965).
Mikkal et al., "Trud. Tallinskogo Politekhicheskogo Instituta", (U.S.S.R.), Series A, 236, p. 51–59, (1966).
Raudsepp et al., "Trud. Tallinskogo Politekhicheskogo Instituta", (U.S.S.R.), Series A, 270, p. 73–84, (1969).

*Primary Examiner*—Henry R. Jiles
*Assistant Examiner*—Bernard I. Dentz
*Attorney, Agent, or Firm*—Stewart N. Rice; Ralph M. Pritchett

[57] ABSTRACT

A hydrocarbon, for example an alkane and more particularly a lower alkane such as n-butane, is converted to a mixture comprising maleic anhydride and a carboxylic acid, more particularly acetic acid, by vapor-phase oxidation with molecular oxygen in the presence of a catalyst having as its active component a reduced vanadium oxide having an oxygen:vanadium atomic ratio of approximately 2.3:1 to 1.5:1 in admixture with an oxide of an additive element selected from the group consisting of phosphorus, molybdenum, and mixtures of molybdenum with a member of the group consisting of phosphorus, titanium, and cobalt. The catalyst can be prepared by fusing vanadium pentoxide with the appropriate additive element oxide or oxides to form a fused melt, which is then formed into solid particles of a convenient size which are then treated with a reducing gas until the desired oxygen:vanadium atomic ratio is reached. The hydrocarbon is reacted with molecular oxygen in the presence of the reduced catalyst under hydrocarbon-rich reaction conditions at a temperature which is maintained at a relatively low level whereby the catalyst is maintained at the desired oxygen:vanadium atomic ratio.

15 Claims, No Drawings

PROCESS FOR OXIDIZING A HYDROCARBON TO MALEIC ANHYDRIDE AND ACETIC ACID

BACKGROUND OF THE INVENTION

There is an extensive existing technology relating to the vapor-phase catalytic oxidation of hydrocarbons, normally benzene or alkenes, to form maleic anhydride. The catalysts employed typically comprise vanadium oxides, or mixed oxides of vanadium and molybdenum or vanadium and phosphorus, with or without various additional additives such as, for example, the oxides of copper or other metals. Relatively high temperatures are normally employed, e.g. about 400° to 600°C, and typically the oxidation is carried out in the presence of a large excess of oxygen although there are some disclosures of employing excesses of the hydrocarbon when employing certain feedstocks such as benzene. There is some mention of the formation of carboxylic acids in small quantities as undesired contaminants, but the art has not heretofore been acqainted with methods for catalytically oxidizing a hydrocarbon to produce both maleic anhydride and, in addition, commercially worthwhile quantities of a carboxylic acid co-product, e.g. acetic acid. Of the existing prior art patents the following are particularly relevant in the context of the present invention:

U.S. Pat. No. 3,005,831 (to Dreibelbis) teaches employment of a supported catalyst of vanadium and molybdenum oxides for the oxidation of suitable hydrocarbon feedstocks, generally alkenes, benzene, or substituted benzenes, to form maleic anhydride or methylmaleic anhydride at temperatures in the range of 400°–600°C. An excess of oxygen is preferred, although the possibility of operating under hydrocarbon-rich conditions is mentioned. The possibility of using alkane feedstocks is disclosed, although the results which would be obtained are not set forth.

U.S. Pat. No. 2,358,775 (to Finch et al.) discloses oxidizing halogenated hydrocarbons with a catalyst comprising oxides of vanadium and molybdenum and, optionally, certain other additives, to form fumaric acid. Before use, the catalyst is reduced to lower oxides not specifically identified, but it is then employed under excess-oxygen reaction conditions.

U.S. Pat. No. 2,294,130 (to Porter) discloses oxidizing various feedstocks, including alkanes, to maleic anhydride in the presence of a supported catalyst comprising oxides of vanadium, molybdenum, and phosphorus under excessoxygen conditions at about 400°–600°C.

A large number of patents have been issued to R. O. Kerr, employing feedstocks which are typically alkenes and catalysts comprising vanadium oxides with various additives including phsophorus oxides under excess-oxygen reaction conditions and relatively high reaction temperatures, e.g. 400°C and higher. U.S. Pat. No. 3,156,706 to this inventor discloses the desirability of reducing the vanadium oxide in the catalyst, before use, to a state such that the valence of vanadium is about 2.5 to 4.6. U.S. Pat. No. 3,255,213, to the same inventor, discloses reducing the vanadium oxide to a valence of about $V^{4+}$ before use; this patent also mentions small quantities of acetic acid as an undesirable contaminant in the product, and certain catalyst additives are employed to reduce acetic acid formation. There are a large number of other patents to this inventor in this general area.

Although the prior art as exemplified by the patents identified above is extensive as it relates to manufacturing maleic anhydride, particularly from aromatic or olefinic feedstocks, it is relatively scanty in disclosures of how the relatively less expensive alkane feedstocks might be employed in maleic anhydride manufacture, and methods for producing high yields of both maleic anhydride and acetic acid by oxidizing a hydrocarbon in a single reaction are particularly lacking.

It is, accordingly, an object of the present invention to provide a process and catalyst for use in oxidizing a hydrocarbon, e.g. an alkane, particularly a lower alkane and especially butane, to produce in one oxidation reaction step a product comprising both maleic anhydride and a carboxylic acid. It is a particular object to provide a catalyst, and a process for employing the catalyst, for oxidizing n-butane to a product comprising maleic anhydride and acetic acid.

Other objects will apparent from the following detailed specification and claims.

SUMMARY OF THE INVENTION

In accordance with the present invention a hydrocarbon, such as a lower alkane and particularly n-butane, is converted to maleic anhydride and a hydrocarbyl carboxylic acid, e.g. an alkanoic acid and especially acetic acid, by vapor-phase oxidation within a controlled temperature range, i.e. at a temperature above about 200°C and not exceeding about 500°C, preferably within the range of about 250° to 400°C, under hydrocarbon-rich conditions and in the presence of a solid catalyst having as its active component a vanadium oxide in admixture with an oxide of an additive element which is a member of the group consisting of phosphorus, molybdenum, and mixtures of molybdenum with a member of the group consisting of phosphorus, titanium, and cobalt. The vanadium oxide component of the catalyst has an atomic ratio of oxygen to vanadium between about 2.3:1 and 1.5:1, this ratio being obtained by chemically reducing, to the degree necessary, a catalyst which may initially have a higher oxygen:vanadium ratio. The desired ratio is then maintained during use by maintaining hydrocarbon-rich reactant proportions within the reactions zone. Maintenance of hydrocarbon-rich conditions prevents overoxidation of the vanadium oxide to the pentavalent state, which is not desired. Controlling the temperature above about 200°C and preferably at or above about 250°C likewise prevents oxidation to the pentavalent state caused by preferential oxidation of the catalyst as compared with the hydrocarbon. That is, hydrocarbon oxidation is quite slow below about 200°–250°C while the catalyst continues to be susceptible to oxidation by the oxygen which is present.

The invention also embraces methods for preparing catalysts for use in the hydrocarbon oxidation process with which the invention is concerned. A preferred method comprises fusing the desired additive element or elements (e.g. phosphorus, molybdenum, titanium, or cobalt) as the oxide or as a salt which is thermally decomposable to the oxide, with a quantity of vanadium pentoxide. Solid particles of a convenient size for use as catalyst are then prepared from the resulting melt, as by extrusion and cooling or by cooling followed by comminution of the resulting solid to small particles. The particles are then treated with any of several reducing gases at an elevated temperature until the contained vanadium oxide has the desired oxygen:

vanadium atomic ratio of about 2.3:1 to 1.5:1. Preferably the vanadium oxide is entirely converted to vanadium tetraoxide of the tetragonal crystal form for optimum activity in the desired hydrocarbon oxidation reaction although crystallographic examination of catalysts having less than about 80–90 mole percent vanadium oxide is very difficult. This catalyst-reduction step can be effected, if desired, by simply employing the unreduced catalyst particles in the hydrocarbon oxidation reaction under the conditions of hydrocarbons richness and controlled process temperatures specified herein for that reaction; the resulting process environment provides the controlled reducing conditions necessary to reduce the catalyst to the desired active form. In this mode of catalyst activation it will be recognized that, for a period of one to several days the yield of maleic anhydride and carboxylic acid will be comparatively low until, with continued operation, the catalyst has been brought to the desired activation state.

DETAILED DESCRIPTION AND PREFERRED EMBODIMENTS

It is possible to prepare suitable catalysts by employing an inert support material, e.g. pumice or alundum, with the desired oxides of vanadium and the other additives named above filling the interstices of the support and, in any event, coating its exterior surfaces. This can be accomplished, for example, by immersing the support, preferably in a porous absorbent form, in an aqueous solution of the desired catalytic elements in the form of compounds which, upon calcining at elevated temperatures, in an atmosphere comprising oxygen if necessary, will be decomposed, and if necessary oxidized, to the desired oxides. For example, the vanadium compound may be ammonium metavanadate, or decomposable salts such as oxalates or formates can be employed. Several procedures are known in the existing maleic anhydride art for preparing hydrocarbon oxidation catalysts loaded with the oxides of vanadium, phosphorus, molybdenum, etc., and any of these can be employed if desired in preparing the present catalysts. It is also possible to use these same techniques in the absence of a support, to prepare an unsupported mass of the mixed calcined oxides which can be used as catalysts.

However, a particularly useful method, by which a very effective catalyst of controlled composition is formed, is to fuse, into a matrix consisting essentially of vanadium pentoxide, the desired quantity of the additive element or elements in the form of the oxide or in the form of a compound which is easily decomposed to the oxide under the influence of elevated temperature (such as the hydroxide or a thermally-decomposable salt, such compounds being equivalent to the oxides for the present purpose). Phosphorus pentoxide, for example, is a useful source of phosphorus, molybdenum trioxide is a suitable source of molybdenum, titanium dioxide and cobalt oxide of cobalt. Lower oxides of the additive elements, particularly of molybdenum, can be employed if desired, the process of fusion with vanadium pentoxide resulting in conversion of the additive oxides to the oxide forms just named while a portion of the vanadium pentoxide is simultaneously reduced to the desired vanadium tetraoxide.

In carrying out the fusion it is important only that the additive oxide be intimately distributed throughout the mass of fused vanadium pentoxide, as by thorough stirring. Fusion temperature is not critical but it should preferably be high enough to produce a fluid, or at least a paste, melt. Ordinarily a temperature of at least about 650°C is needed, subject to some variation depending upon the fusion characteristics of the particular formulation being prepared.

After fusion of the additive oxide into the vanadium pentoxide, the melt is processed into solid discrete particles, typically by allowing it to cool and harden followed by simple mechanical comminution into particles of any desired size (advantageously about 3 to 6 mm for use in a fixed catalyst bed although other sizes can be employed if desired). Alternatively the melt can be extruded into rods which are then chopped to the desired size or, alternatively, it can be cast into pellets or formed into prills. For fluid catalyst use particles of roughly 60 microns are useful.

The catalyst particles prepared from the fused melt as explained above are then chemically reduced until the contained vanadium oxide within the particles has an oxygen:vanadium atomic ratio between about 2.3:1 and about 1.5:1. Ideally, all the vanadium should be present as vanadium tetraoxide of the tetragonal crystal form and this is, in fact, the condition toward which all catalyst having a high enough vanadium content that crystallographic examination is possible trends with continued use in the hydrocarbon oxidation process under the conditions of reaction temperature and hydrocarbon: oxygen ratio to be specified hereinbelow. It is not essential, however, that all the vanadium be present as the tetraoxide for the attainment of adequate process results.

The course of the catalyst reduction operation can be followed, to some extent, by x-ray diffraction methods in that as reduction proceeds the x-ray diffraction lines characteristic of vanadium pentoxide diminish. A corresponding increase in diffraction lines characteristic of vanadium tetraoxide may not always be easy to detect, however, in the presence of more than about 10 to 20 mole percent of the additives which are present in the catalyst. Therefore, a practical approach to the problem is to carry out the catalyst reduction under certain conditions which have been found by experimentation to produce a satisfactory catalyst regardless of whether unequivocal evidence of the oxidation state of the contained vanadium is in hand. These are as follows:

Except when sulfur dioxide is being employed as the reducing gas, in which case it is recommended that the catalyst particles be exposed to the reducing gas for about 120 to 240 hours at a temperature of about 500°C to 600°C, it has been found that the desired degree of catalyst reduction occurs when the catalyst is exposed to an atmosphere of reducing gas at a temperature not exceeding about 500°C and preferably in the range of about 350°C to 450°C for at least about 12 hours, preferably for about 24 to 48 hours. These conditions apply in particular when the reducing gas is a member of the group consisting of hydrogen, carbon monoxide, and the oxidation product gas resulting from oxidizing a hydrocarbon gas with molecular oxygen in a proportion such that the mixture contains hydrocarbon in a concentration which is above the upper explosive limit of the hydrocarbon in admixture with the other components. It is also to be noted that an oxidation product gas of satisfactory reducing characteristics is obtained when the catalyst is simply employed in the hydrocarbon oxidation process aimed at producing a carboxylic acid and maleic anhydride with which the present invention is basically concerned. In other words, the catalyst reduction can be carried out if desired by simply placing the unreduced catalyst particles in the hydrocarbon oxidation reactor, initiating the oxidation reaction under the hydrocarbonrich conditions under which it is normally carried out, and continuing the reaction with a resulting increase in catalyst activity until a steady-state condition of adequately activated catalyst is obtained (as indicated by continuing increase in hydrocarbon conversion to maleic anhydride and carboxylic acid to an ultimate steady-state condition).

In addition to the reducing gases named above as being suitable, of which the hydrogen, carbon monoxide, and hydrocarbon oxidation product gas are particularly useful, other reducing gases can if desired be employed, for example: benzene, xylene, the butenes, ammonia, and methanol. With these gases the recommended reduction conditions (i.e. temperature and reduction time) are the same as with the hydrogen, carbon monoxide, or oxidation product gas.

In reducing the catalyst, the catalyst particle size is not critical although smaller particles are, of course, more amenable to quick reduction. Particles up to about 6 mm in diameter have been found to be, in particular, quite suitable and easily reducible. Reduction takes place readily throughout the interior of the particles as well as at the surface.

Concerning the condition of the additive element oxides which are in admixture with the vanadium oxide in the reduced catalyst, reduction of the vanadium oxide to the desired state will inherently result in conversion of the additive oxides to satisfactory and useable oxidation states. These oxidation states are not known with certainty but they can be defined in operational terms. That is, any phosphorus oxide which is present will be in that form toward which phosphorus pentoxide trends when it is reduced with the reducing gas in the presence of vanadium oxide having an oxygen:vanadium atomic ratio of about 2.3:1 to 1.5:1 as specified above. Molybdenum oxides will be in the oxidation state toward which molybdenum trioxide trends under the same conditions, titanium oxides will be in the state toward which titanium dioxide trends under the same conditions, and cobalt oxides will be in the oxidation state toward which cobaltous oxide trends also under the same conditions. In preparing the catalyst, however, proper reduction of the vanadium oxides is the controlling factor. As has been mentioned above, the several oxide components of the catalyst have, as their equivalents in the context of the present process, other compounds of the same elements which, upon calcining in air at about 300° to 700°C, will decompose to the oxides.

Of the several catalyst systems which can be employed in the present process, those which comprise vanadium-molybdenum oxides are preferred although commercially feasible yields are also obtained with the system consisting of vanadium-phosphorus oxides. A catalyst having as its active component molybdenum oxides in admixture with a preponderant quantity of vanadium oxides gives better results (measured by the percentage of reacted hydrocarbon converted to the desired end products), and addition of oxides of phosphorus, titanium, or cobalt to the vanadium-molybdenum oxide system gives even better results by increasing the formation of carboxylic acid, e.g. acetic acid, while reducing undesired carbon oxides formation with little change in maleic anhydride yield. A particularly effective catalyst has been found to be one produced by reduction of a mixture consisting essentially of 48 mole percent molybdenum trioxide, 2 mole percent phosphorus pentoxide, and the remainder vanadium pentoxide.

Although particular ranges of catalyst composition are not critical, preferred ranges which have been found particularly useful include:

a. A mixture of vanadium oxides and phosphorus oxides containing about 1 to 15 atoms of phosphorus per 100 atoms of vanadium.

b. A mixture of vanadium oxides and molybdenum oxides containing about 2 to 60 atoms of molybdenum per 100 atoms of vanadium.

c. A mixture comprising vanadium oxides, molybdenum oxides, and an oxide of at least one additional additive element which is a member of the group consisting of phosphorus, titanium, and cobalt, the total mixture containing, per 100 atoms of vanadium, about 2 to 60 atoms of molybdenum and about 1 to 25 atoms of the second additive element or elements.

d. As a specific useful species of the family of catalysts described immediately above, a mixture consisting essentially of vanadium oxides, molybdenum oxides, and phosphorus oxides containing, per 100 atoms of vanadium, about 5 to 50 atoms of molybdenum and about 1 to 10 atoms of phosphorus.

e. As another specifically useful species of the family of catalysts identified in (c) above, a mixture consisting of vanadium oxides, molybdenum oxides, and titanium oxides in amounts such that there are present, per 100 atoms of vanadium, about 5 to 50 atoms of molybdenum and about 10 to 20 atoms of titanium.

f. As another specifically useful member of the family described broadly in (c) above, a mixture consisting essentially of vanadium oxides, molybdenum oxides, and cobaltous oxide containing, per 100 atoms of vanadium, about 5 to 50 atoms of molybdenum and about 1 to 10 atoms of cobalt.

The effect of the catalyst additives (i.e. the oxides of elements other than vanadium which are incorporated into the vanadium oxide to prepare the present catalysts) obtains down to very low additive concentrations, defined as the number of atoms of additive element incorporated into the catalyst for each 100 atoms of vanadium which are present. Effective catalyst performance as measured by the production of commercially attractive quantities of acetic acid in addition to the maleic acid produced will obtain, however, when, for every 100 atoms of vanadium present in the catalyst, there is present at least about one atom of each of the additive elements being employed in the formulation of the catalyst in question. Generally speaking, the ratio of additive element atoms to vanadium atoms in the catalyst is preferably between about 0.02:1 and 1:1.

In employing the catalyst described above to oxidize a hydrocarbon feedstock to maleic acid and acetic acid (it being recognized, of course, in the present context that the term maleic acid includes also maleic anhydride), the most important of the several process parameters to be controlled are the oxidation temperature and the oxygen:hydrocarbon ratio obtaining in the mixture of oxygen and hydrocarbon feedstock which is introduced into the catalyst-containing reaction zone.

Regarding the oxygen:hydrocarbon mole ratio more specifically, the primary criterion is that this ratio be low enough that the gaseous environment resulting from reaction of the hydrocarbon with the oxygen in the presence of the catalyst be of a reducing nature. That is, as the term is generally understood, the mixture should be on the hydrocarbon rich side of the range of explosive compositions. When such a process environment is maintained, the catalyst remains indefinitely at the desired oxidation state, i.e. tetragonal vanadium tetraoxide, provided that the other primary parameter, i.e. temperature, is also properly controlled as will be discussed below. An adequately hydrocarbon-rich environment will obtain when oxygen is admixed into the hydrocarbon feedstock in a proportion of less than about 0.5 atom of oxygen per atom of carbon contained in the hydrocarbon (normally an alkane). In any event, hydrocarbon-lean conditions are to be avoided, defined aas conditions in which there is present at least enough oxygen for combustion of the entirety of the hydrocarbon feedstock.

It will be recognized that the foregoing comments regarding oxygen: hydrocarbon ratio relate to oxygen which is introduced into the reaction zone as such and not to oxygen which may be introduced in chemically-combined form, e.g. as steam or as carbon oxides, which may be present in substantial quantities if desired without adversely affecting the reaction. Steam, in fact, has a beneficial effect on acetic acid yield. Other inert gases can be present without adverse effect. Nitrogen is often present, of course, since the oxygen is, in fact, conveniently introduced into the system in the form of air. Carbon oxides are also inert (aside from their reducing effect, which is not detrimental) and are in fact commonly present as one of the reaction products.

Other reducing gases, e.g. hydrogen, methane, and vapors of other hydrocarbons such as ethane, have no adverse affect so long as the temperature is controlled within the limits to be discussed below. It will be recognized, of course, that the vapors of hydrocarbons having two or more atoms may themselves be oxidized in the reaction with resulting consumption of a portion of the oxygen to form reaction products other than the carboxylic acid and maleic anhydride which are normally preferred. Some yield of maleic anhydride and commercially useful carboxylic acid will obtain, however, when there is included in the reaction feedstock almost any hydrocarbon, particularly alkene or alkane, having at least about 4 carbon atoms; such hydrocarbons can be regarded either as reaction feedstock or as process diluents. In any event, their presence does not adversely affect the catalyst.

Within the limitations discussed above regarding maintenance of a hydrocarbon-rich process environment, more particularly preferred reactant mole ratios include, when reacting n-butane with oxygen, a proportion of at least about 1 to 100 moles of n-butane per mole of oxygen and, especially, a proportion of from about 5 to about 1.2 moles of n-butane per mole of oxygen. Good results are obtained at 1.0 mole of n-butane per mole of oxygen, but at this ratio and below it becomes necessary to take steps, such as the use of a fluidized catalyst bed, to guard against the hazards of handling potentially explosive gas mixtures.

Oxygen:hydrocarbon mixtures within the composition range discussed above are not only suitable reaction feedstocks but also, when passed over the catalyst under the temperature conditions to be discussed below, provide a reducing environment suitable for catalyst activation (e.g. for reduction of $V_2O_5$ to $V_2O_4$).

That is, simply starting up the reaction system with an initially over-oxidized catalyst and continuing to operate it with a feedstock which is rich in hydrocarbon as described above will result in progressively improving the activity of the catalyst to the desired steady-state level.

The second primary process control parameter is temperature. The lower recommended temperature limit is about 250°C. Slightly lower temperatures down to about 230°C, for example, can be employed without adverse effect except for an unnecessarily reduced reaction rate and the danger of oxidizing the catalyst preferentially as compared with the desired hydrocarbon oxidation as mentioned above. Preferably, as when oxidizing n-butane, the temperature should be not higher than about 400°C for optimum reaction rate and chemical selectivity. Carbon oxide formation increases undesirably above about 400°C. The upper temperature limit recommended for the reaction in any event is about 500°C. Above this temperature, it has been found that combustion reactions predominate.

As just explained, the most important of the process parameters are the oxygen:hydrocarbon ratio and the reaction temperature. Of the other parameters, reaction pressure is not critical. Good results are obtained when the reaction is conducted at atmospheric pressure, but super-atmospheric pressures can be employed with a resulting increase in reactor-space time yield. For example, pressures in the range of about 5 to 10 atmospheres absolute or higher can be employed as well as substantially atmospheric pressure.

Reactor space velocity is likewise not critical, although it is preferred to operate at a reactor throughput rate which does not exceed the rate at which unreacted molecular oxygen can be detected in the reactor effluent. Generally speaking, good results have been obtained in the oxidation of n-butane with air when, per liter of catalyst bed volume, the total reactor throughput of butane and air did not exceed about 100 gram-moles per hour with the reactor being operated at atmospheric pressure and at a temperature of about 250° to 400°C. The only adverse effect of operating at extremely low reactor throughput rates is simply a decrease in reactor productivity, i.e. under-utilization of the reactor. In oxidizing butane with air at atmospheric pressure, preferred reactor throughput rates are about 30 to 90 gram-moles per hour per liter of catalyst bed volume. By increasing the pressure it becomes possible to increase the throughput. Specifically, doubling the absolute pressure allows doubling the mass throughput rate, quadrupling pressure allows quadrupling throughput, etc.

The catalyst can conveniently be employed in the form of a fixed bed of particles of about 0.4 to 2 mm diameter, although the use of larger or smaller particles is not precluded. The use of a fluid bed is also not precluded. Advantageously the catalyst particles can be packed in tubes surrounded by a suitable heat transfer medium for use in maintaining the desired reaction temperature within the catalyst bed. It will be recognized that the hydrocarbon oxidation is exothermic but that provision for preheating the catalyst bed is useful or initiating the reaction.

As hydrocarbon feedstock for the process, n-butane is especially useful in obtaining as reaction products acetic acid and maleic anhydride in high carbon efficiency. Other alkanes can be employed, however, especially lower alkanes of about 4 to 8 carbon atoms. Even higher alkanes can be employed, as well as alkenes, although it will be recognized that n-butane is preferred from the standpoint of producing a minimum of reaction by-products. Higher alkanes and other hydrocarbons, especially those having odd numbers of carbon atoms in the molecule, will tend to form, for example, other carboxylic acids in addition to the ordinarily-preferred acetic acid, and with feedstocks having as many as six carbon atoms in the molecule there is a tendency toward formation of aromatic by-products.

The following examples are given to illustrate the invention further. It will be recognized that many variations may be made therefrom within the scope of the invention.

EXAMPLE I

Granular molybdenum trioxide, phosphorus pentoxide, and vanadium pentoxide were thoroughly mixed to form a mixture consisting of 48 mole % molybdenum trioxide, 2 mole % phosphorus pentoxide, and 50 mole % vanadium pentoxide. The resulting mixture was placed in a muffle furnace maintained at about 800°C and was left in the furnace until the mixture had formed a homogeneous melt (which required approximately 60 minutes). No special atmosphere was employed; during the melting operation the contents of the furnace were exposed to the atmosphere.

The hot melt was removed from the furnace and allowed to cool and solidify in the atmosphere, after which the resulting solid mass was broken up and comminuted into solid particles the largest of which had a diameter of approximately 2 mm.

Approximately 10 grams of particles of approximately 0.6 mm to 0.8 mm diameter were then screened out of the comminuted particles (fine powder being excluded in order to facilitate packing the particles into a fixed catalyst bed), and packed into a titanium catalyst case (ferrous metals can also be employed) approximately 10 mm in inside diameter and containing, when loaded, a bed of the solid catalyst approximately 14 cm in length. The catalyst case was provided with external means for adjusting its internal temperature, as measured by an internal thermocouple. Means were provided for introducing gases at a controlled rate into one end of the catalyst case and for withdrawing effluent gases from the other end of the catalyst case for measurement and chemical analysis.

The bed of catalyst just described was then activated (i.e. reduced to a controlled state of chemical reduction) by passing through it, at a temperature of about 380°C, a mixture of n-butane and air consisting of 50 volume percent n-butane vapor and the remainder air. This butane-air mixture was passed through the catalyst bed at a rate of approximately 60 ml per minute (measured at normal atmospheric temperature and pressure) for approximately 16 hours, at the end of which period an X-ray diffraction analysis of a cooled sample of the catalyst indicated that substantially none of the vanadium was now in the pentoxide form.

Equally good catalyst activation is obtained by using as the reducing agent hydrogen, carbon monoxide, or butane, passed through the catalyst bed at substantially the same flow rate and temperature described above in the case of the butane-air mixture. Sulfur dioxide can also be employed as a reducing agent, but in this case the reduction is carried out for approximately 120 hours at a temperature of about 500°C.

EXAMPLE II

At a pressure of approximately 1 atmosphere absolute and at a temperature of approximately 340°C, a mixture of air and n-butane in the vapor state was passed continuously through a bed of the activated catalyst of Example I. The gaseous mixture contained, by volume, approximately 43% n-butane, 43% air, and 14% water vapor. Approximately 60 gram-moles of the gaseous mixture just described were passed per hour through the catalyst bed per liter of packed catalyst.

Chemical analysis of the gaseous effluent withdrawn from the catalyst bed indicated that, of the n-butane which had been passed through the bed, approximately 95% had passed through unconverted, 1.5% had been converted to acetic acid, and 1.0% had been converted to maleic acid or maleic anhydride. (The product gases, before collection and analysis, which involved absorption into an aqueous medium, contained maleic anhydride but this was ultimately recovered and analyzed chemically in the form of maleic acid.) Approximately 2.5% of the n-butane initially fed into the catalyst bed was converted to carbon oxides.

Butene or butadiene can be used as feedstock in a manner similar to the above, but the reaction is not so selective to the desired acetic acid and maleic acids.

When operating the reaction system as above, the catalyst retains its activity over long periods of time without any noticeable decline, inasmuch as the reaction conditions are such that catalyst deactivation does not take place.

EXAMPLE III

In the following tabulated set of operating results obtained with several catalysts, all of the catalysts excepting catalyst (i) were prepared by melting vanadium pentoxide with the oxide or oxides of the additive element indicated for one hour at 827°C followed by cooling, crushing the resulting solid, and recovering from the crushed solid the particles which passed an opening of 0.84 mm and were retained on a screen having openings of about 0.59 mm. Catalyst (i) was prepared by dissolving 35.1 grams of $NH_4VO_3$ and 88.3 grams of $(NH_4)_6Mo_7O_{24}\cdot 4H_2O$ in a minimum amount of hot water, to which 58.7 grams of $TiO_2\cdot H_2O$ was added as a slurry. The water was then removed in a rotary evaporator under vacuum and the resulting solid was dried overnight at 100°C after which the dry solid was calcined overnight at 500°C, cooled, and then crushed and screened to particles of the same size as the other catalysts just described. All of the catalysts were activated before use by having passed over them a 1:1 (by volume) mixture of butane and air at atmospheric pressure for 16 hours at 370°C.

In each run, butane, air, and water (where indicated) were passed in the vapor form at the indicated temperature and at atmospheric pressure through a cylindrical catalyst bed approximately 10 mm in diameter and 140 mm tall containing approximately 10 grams of the catalyst particles. Product yields as listed were determined by chemical analysis of the reactor effluent.

Unless otherwise indicated, all flow rates are in ml per minute of the compound indicated, in the vapor phase at room temperature and pressure. Carbon efficiency is defined as atoms of carbon accounted for in the reaction product in the form of the compound listed, divided by atoms of carbon in the butane consumed in the reaction. Run duration is expressed in minutes.

The several catalysts were prepared by either fusing

Results obtained when oxidizing butane in the presence of the above-described catalysts, at temperatures and reactant feed rates as listed were as follows:

TABLE I

| Run No. | 1 | 2 | 3 | 4 | 5 |
|---|---|---|---|---|---|
| Catalyst | a | a | a | b | c |
| Temperature, °C: | | | | | |
| Coolest zone | 305 | 320 | 339 | 347 | 290 |
| Hottest zone | 327 | 339 | 348 | 351 | 295 |
| Feed Rate: | | | | | |
| Butane | 58.8 | 30.0 | 30.3 | 58.2 | 61.2 |
| Air | 58.8 | 120 | 121 | 60.6 | 60.0 |
| $H_2O$ | 0.0 | 0.0 | 20.3 | 20.3 | 20.3 |
| Duration of Run | 180 | 90 | 130 | 100 | 160 |
| Conversion, %: | | | | | |
| Butane | 5.4 | 19.4 | 20.6 | 5.1 | 5.3 |
| Oxygen | 100 | 100 | 100 | 100 | 100 |
| Carbon Efficiency to: | | | | | |
| Carbon monoxide | 26 | 30 | 25 | 29 | 25 |
| Carbon dioxide | 19 | 21 | 16 | 19 | 19 |
| Acetic acid | 31 | 26 | 34 | 29 | 35 |
| Acrylic acid | 2 | 2 | 3 | 4 | 1 |
| Maleic acid | 22 | 22 | 21 | 19 | 17 |

| Run No. | 6 | 7 | 8 | 9 | 10 |
|---|---|---|---|---|---|
| Catalyst | d | e | f | g | h |
| Temperature, °C: | | | | | |
| Coolest zone | 269 | 321 | 245 | 310 | 332 |
| Hottest zone | 274 | — | — | — | 362 |
| Feed Rate: | | | | | |
| Butane | 58.8 | 65.7 | 61.9 | 60.3 | 60.3 |
| Air | 60.0 | 58.0 | 59.7 | 60.9 | 60.6 |
| $H_2O$ | 20.3 | 20.3 | 20.3 | 20.3 | 20.3 |
| Duration of Run | 120 | 240 | 150 | 70 | 150 |
| Conversion, %: | | | | | |
| Butane | 5.1 | 4.7 | 4.8 | 5.7 | 5.5 |
| Oxygen | 100 | 100 | 100 | 100 | 100 |
| Carbon Efficiency to: | | | | | |
| Carbon monoxide | 26 | 28 | 33 | 27 | 24 |
| Carbon dioxide | 19 | 16 | 22 | 15 | 15 |
| Acetic acid | 43 | 38 | 37 | 31 | 39 |
| Acrylic acid | 0 | 1 | 0 | 2 | 2 |
| Maleic acid | 10 | 16 | 7 | 24 | 20 |

| Run No. | 11 | 12 | 13 | 14 | 15 |
|---|---|---|---|---|---|
| Catalyst | i | j | k | k | l |
| Temperature, °C: | | | | | |
| Coolest zone | 316 | 350 | 343 | 341 | 350 |
| Hottest zone | 394 | 403 | 378 | 366 | — |
| Feed Rate: | | | | | |
| Butane | 63.0 | 60.3 | 58.8 | 58.0 | 29.5 |
| Air | 60.9 | 59.7 | 59.5 | 58.8 | 30.1 |
| $H_2O$ | 20.3 | 20.3 | 0.0 | 20.3 | 20.3 |
| Duration of Run | 150 | 90 | 180 | 240 | 240 |
| Conversion, %: | | | | | |
| Butane | 4.7 | 5.3 | 4.3 | 5.4 | 5.4 |
| Oxygen | 100 | 100 | 100 | 100 | 100 |
| Carbon Efficiency to: | | | | | |
| Carbon monoxide | 35 | 28 | 28 | 24 | 30 |
| Carbon dioxide | 21 | 16 | 19 | 14 | 19 |
| Acetic acid | 22 | 35 | 28 | 38 | 37 |
| Acrylic acid | 2 | 2 | 1 | 2 | 1 |
| Maleic acid | 20 | 19 | 24 | 22 | 13 | oxides or by a precipitation technique (i.e. catalyst (i) above), followed by reduction as explained above. Before fusion and reduction the compositions of the several catalysts were as follows:

| Catalyst | Composition, mole % |
|---|---|
| (a) | 70% $V_2O_5$:28% $MoO_3$:2% $P_2O_5$ |
| (b) | 70% $V_2O_5$:30% $MoO_3$ |
| (c) | 70% $V_2O_5$:25% $MoO_3$:5% CoO |
| (d) | 98% $V_2O_5$:2% $P_2O_5$ |
| (e) | 80% $V_2O_5$:11% $MoO_3$:9% $P_2O_5$ |
| (f) | 95% $V_2O_5$:5% $MoO_3$ |
| (g) | 70% $V_2O_5$:20% $MoO_3$:10% $TiO_2$ |
| (h) | 50% $V_2O_5$:50% $MoO_3$ |
| (i) | 22% $V_2O_5$:35% $MoO_3$:43% $TiO_2$ |
| (j) | 50% $V_2O_5$:40% $MoO_3$:10% $TiO_2$ |
| (k) | 50% $V_2O_5$:48% $MoO_3$:2% $P_2O_5$ |
| (l) | 90% $V_2O_5$:10% $P_2O_5$ |

The embodiments of the invention in which an exclusive property or privilege is claimed are defined as follows:

1. A method for converting a lower alkane having at least four carbon atoms to oxygenated derivatives thereof which comprise acetic acid and maleic anhydride, which method comprises:

passing said alkane in the vapor phase, along with molecular oxygen in an amount not exceeding about 0.5 atom of oxygen per atom of carbon contained in said alkane, through a reaction zone maintained at a temperature between about 200° and about 500°C and containing a bed of particles of a solid catalyst comprising (a) vanadium oxide having an oxygen: vanadium atomic ratio between about 2.3:1 and 1.5:1 and (b) admixed with said vanadium oxide, an oxide of an additive element which is a member of the group consisting of phosphorus, molybdenum, and mixtures of molybdenum with a member of the group consisting of phosphorus, titanium, and cobalt said catalyst being one which has been prepared by a. fusing together vanadium pentoxide and an oxide of said additive element;
b. allowing the resulting melt to cool and harden to a friable mass;
c. comminuting said mass to discrete particles; and
d. exposing said particles to a reducing gas at a temperature of about 350° to 450°C. until the atomic ratio of oxygen to vanadium in the vanadium oxide contained therein is about 2.3:1 to 1.5:1.

2. The method of claim 1 wherein the oxidation state of said additive element oxide is that toward which, under the conditions of said reaction and in the presence of said vanadium oxide, phosphorus pentoxide trends when said additive comprises a phosphorus oxide, molybdenum trioxide trends when said additive comprises a molybdenum oxide, titanium dioxide trends when said additive comprises a titanium oxide, and cobaltous oxide trends when said additive comprises a cobalt oxide.

3. The method of claim 2 wherein the alkane is n-butane and wherein said reaction is carried out in a reaction zone containing said catalyst in particulate form, with butane and a gaseous source of molecular oxygen being continuously passed through said reaction zone in a proportion of at least about 100 moles to about 1 mole of n-butane per mole of oxygen.

4. The method of claim 3 wherein said proportion is from about 5 moles to about 1 mole of butane per mole of oxygen.

5. The method of claim 3 wherein said catalyst consists essentially of said vanadium oxide in intimate admixture with said additive element oxide, the atomic ratio of additive element to vanadium in said catalyst being from about 1.0:1 to about 0.02:1.

6. The method of claim 1 wherein said oxide of said additive element is phosphorus pentoxide when the additive element is phosphorus, molybdenum trioxide when the additive element is molybdenum, titanium dioxide when the additive element is titanium, and cobaltous oxide when the additive element is cobalt.

7. The method of claim 1 wherein said reducing gas comprises a member of the group consisting of (a) hydrogen, (b) carbon monoxide, and (c) the oxidation product gas resulting from oxidizing a hydrocarbon gas with molecular oxygen in a proportion such that the hydrocarbon content of the mixture is above the upper explosive concentration of said hydrocarbon in admixture with the other components of the mixture.

8. The method of claim 7 wherein said reducing gas is said oxidation product gas and said hydrocarbon is said lower alkane which is to be converted to oxygenated derivatives thereof in the presence of said catalyst.

9. The method of claim 8 wherein said lower alkane is n-butane.

10. The method of claim 9 wherein n-butane and a gas comprising molecular oxygen are passed through said reaction zone at a temperature of about 250° to 400°C and in a molar proportion of n-butane to molecular oxygen of about 5:1 to 1.2:1.

11. The method of claim 9 wherein said gas comprising molecular oxygen is a member of the group consisting of oxygen and mixtures of oxygen with nitrogen.

12. The method of claim 11 wherein the gas comprising molecular oxygen is air.

13. The method of claim 1 wherein the additive element is phosphorus in an amount of about 1 to 15 atoms of phosphorus per 100 atoms of vanadium.

14. The method of claim 1 wherein the additive element is molybdenum in an amount of about 2 to 60 atoms of molybdenum per 100 atoms of vanadium.

15. The method of claim 1 wherein the additive element is molybdenum, in an amount of about 5 to 50 atoms of molybdenum per 100 atoms of vanadium, admixed with phosphorus, in am amount of about 1 to 10 atoms per 100 atoms of vanadium.

* * * * *